United States Patent [19]

Sarnecki

[11] 4,278,719
[45] Jul. 14, 1981

[54] WATERPROOF BACKED TOWEL

[76] Inventor: Mildred A. Sarnecki, 1536 E. Mission La., Phoenix, Ariz. 85020

[21] Appl. No.: 84,643

[22] Filed: Oct. 15, 1979

[51] Int. Cl.³ .............................................. B32B 3/04
[52] U.S. Cl. ...................................... 428/78; 428/81; 428/82; 428/88; 428/95; 428/124; 428/193
[58] Field of Search ....................... 428/78, 81, 82, 88, 428/193, 95, 124

[56] References Cited

U.S. PATENT DOCUMENTS

| | | | |
|---|---|---|---|
| 2,140,457 | 12/1938 | Knowland | 428/82 |
| 2,721,818 | 10/1955 | Dolnick | 428/82 |
| 3,669,817 | 6/1972 | McDevitt | 428/82 |
| 3,862,876 | 1/1975 | Graves | 428/193 |

*Primary Examiner*—Marion McCamish
*Attorney, Agent, or Firm*—Leydig, Voit, Osann, Mayer & Holt, Ltd.

[57] ABSTRACT

The invention disclosed is a waterproof backed beach towel comprising an absorbent cover sheet of terrycloth having a soft pile side and a smooth back side, the back side being disposed in face-to-face juxtaposition with a backing sheet of waterproof nylon. The waterproof nylon backing sheet is slightly larger than the terrycloth cover sheet to provide a folded over hem which functions as a moisture dam at the edges of the towel.

1 Claim, 2 Drawing Figures

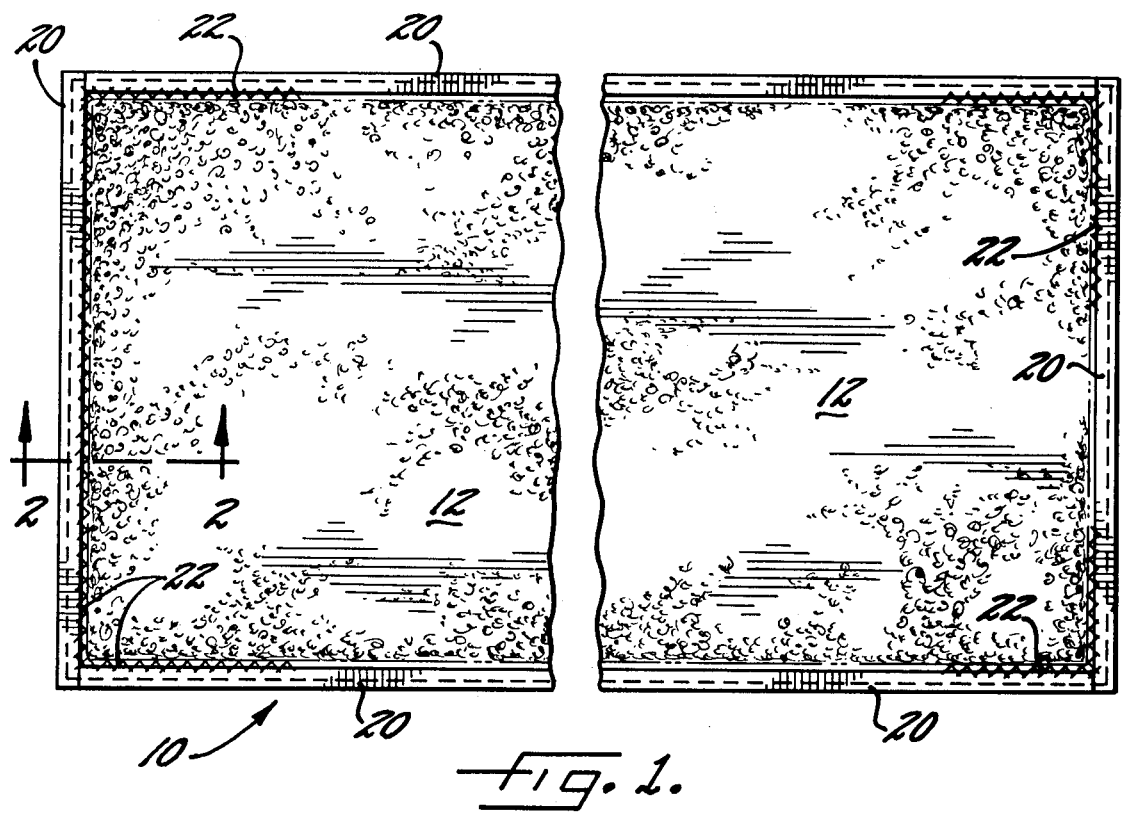
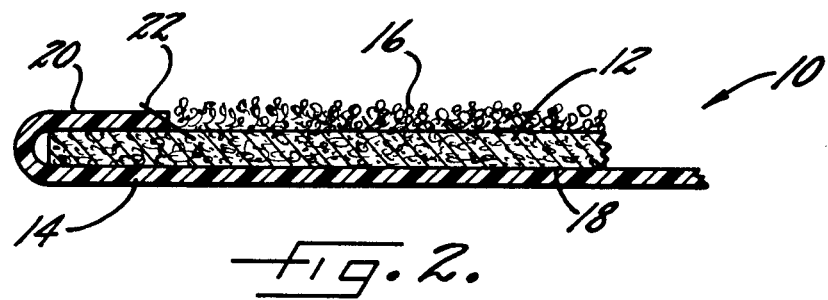

WATERPROOF BACKED TOWEL

DESCRIPTION OF THE INVENTION

This invention relates generally to an absorbent towel, and more particularly, concerns a towel with a waterproof backing which can be used to protect upholstered or wooden furniture after a swimmer has come indoors from a swim and is still wet.

In the situation where an individual has a swimming pool, especially adjacent their home, there are many instances in which a swimmer may be required to come into the house for a short period of time such as to answer a telephone call or for the purposes of eating and may not wish to take the time to change from a wet swimsuit into dry clothes. In order to allow a swimmer to do that, there must be some means available for protecting the upholstered and wooden furniture in the home from the effects of a wet and dripping swimmer.

As a result, it is an object of the present invention to provide a towel with a waterproof backing that would enable a wet swimmer to sit upon upholstered or wooden furniture without getting the furniture wet.

It is a further object of the present invention to provide a waterproof towel which may be used as a protective covering for sitting upon damp ground or grass so that a person watching a concert or picnicking, for example, can be protected from the effects of such dampness.

Finally, it is a further object of the present invention to provide a waterproof towel which may be used as a windbreaker or slicker as protection against the elements.

Other objects and advantages of the invention will become apparent upon reading the following detailed description upon reference to the drawings in which:

FIG. 1 is a plan view of the waterproof backed towel of the present invention; and FIG. 2 is a fragmentary sectional view of the waterproof backed towel along line 2—2 showing the arrangement of the layers of the towel and the edge construction of the towel.

While the invention will be described in connection with the preferred embodiment, it will be understood that I do not intend to limit the invention to that embodiment. On the contrary, I intend to cover all alternatives, modifications, and equivalents as may be included within the spirit and scope of the invention as defined by the appended claims.

Turning to FIG. 1, there is shown a waterproof backed beach towel 10 which is comprised of an absorbent cover sheet 12 and a waterproof backing sheet 14. The cover sheet 12 is a sheet of terrycloth towelling of a preselected size and shape in face-to-face juxtaposition with the waterproof backing sheet 14 which is waterproof nylon.

The arrangement of the terrycloth cover sheet and the waterproof backing sheet is best determined from FIG. 2. The terrycloth cover sheet has a soft pile facing on one side 16 referred to as the huck side, while the other side 18 is relatively smooth and is referred to as the back side. The waterproof backing sheet 14 of waterproof nylon is disposed in face-to-face juxtaposition to the back side 18 of the absorbent cover sheet 12.

It will also be noted from FIG. 2 that the waterproof backing sheet is coextensive with and slightly larger than the absorbent cover sheet 12 so that at the periphery of the absorbent cover sheet, the waterproof backing sheet can be folded over onto the soft pile facing 16 of the cover sheet to form a hem 20 around the entire periphery of the waterproof backed towel.

The hem 20 of the waterproof backed towel is attached to the cover sheet by any suitable means such as zig-zag stitching 22 as shown in FIG. 1 or by means of glue. It should also be understood that the waterproof backing sheet of waterproof nylon may be attached not only around the periphery of the waterproof backed towel but may be attached by means of adhesive to the back side of the terrycloth towelling inwardly from the periphery of the waterproof backed towel.

With respect to the waterproof backing sheet, which is in the preferred embodiment, waterproof nylon, it is important that that material be not only waterproof but that it be washable. Such waterproof nylon offering the twin advantages of being waterproof and being washable is commercially available and is suitable for the present invention. It should also be noted that the adhesive which is used in manufacturing the waterproof backed towel must be insoluble and unaffected by washing of the waterproof backed towel.

The waterproof backed towel of the construction just described can be manufactured in any size or shape to be employed as a beach towel or a ground cloth. The soft pile huck side 16 of the cover sheet 12 offers a comfortable cushiony absorbent surface on which to sit. The smooth back side 18 of the absorbent cover sheet 12 interfaces with the waterproof backing sheet of waterproof nylon 14 to provide a zone in which moisture can be spread from the point of impingement to all areas of the absorbent terrycloth towelling. As a result, the hem 20 provides a dam or barrier which restrains moisture from flowing out of the structure at the edges of the towelling.

I claim as my invention:

1. A waterproof backed towel comprising: (a) an absorbent cover sheet of preselected size consisting of terrycloth which has a huck side and a back side; and (b) a waterproof backing sheet consisting of waterproof nylon, which waterproof backing sheet is coextensive with and slightly larger than the absorbent cover sheet, is in face-to-face juxtaposition with the back side of the absorbent cover sheet and is lapped over onto the huck side of the absorbent cover sheet around the periphery of the cover sheet to form a waterproof edge around the periphery of the cover sheet.

* * * * *